F. J. COCHRAN.
BALL BEARING AXLE.
APPLICATION FILED DEC. 22, 1919.

1,382,064.

Patented June 21, 1921.
2 SHEETS—SHEET 1.

Inventor
F. J. Cochran

By [signature]
Attorney

F. J. COCHRAN.
BALL BEARING AXLE.
APPLICATION FILED DEC. 22, 1919.
1,382,064.
Patented June 21, 1921.
2 SHEETS—SHEET 2.
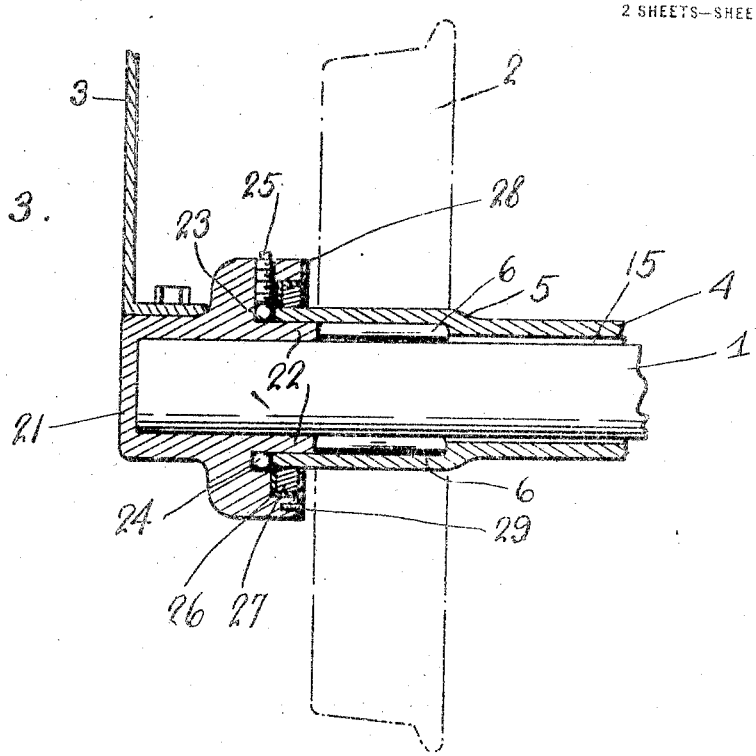
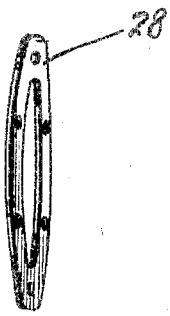
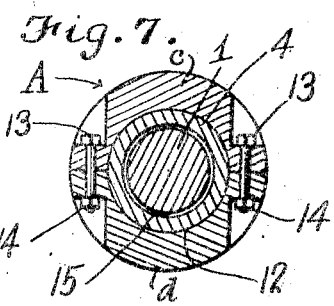
Inventor
F. J. Cochran
Attorney

UNITED STATES PATENT OFFICE.

FREDERIC J. COCHRAN, OF MOUNT VERNON, ILLINOIS.

BALL-BEARING AXLE.

1,382,064.  Specification of Letters Patent.  Patented June 21, 1921.

Application filed December 22, 1919. Serial No. 346,441.

*To all whom it may concern:*

Be it known that I, FREDERIC J. COCHRAN, a citizen of the United States, residing at Mount Vernon, in the county of Jefferson and State of Illinois, have invented certain new and useful Improvements in Ball-Bearing Axles, of which the following is a specification.

This invention relates to new and useful improvements in ball bearing axles for cars of any character, such as street cars, railway cars, mining cars, etc., and is primarily designed as an improvement over the construction for which a patent was granted to me on January 2, 1917, No. 1,210,422.

One object of my invention is to provide an improved ball-bearing axle or journal for the wheels in which there is a roller or ball bearing engagement between all contacting parts, thus reducing friction to the minimum; and which will obviate all danger of the wheels of the car trucks leaving the rails on account of lateral displacement of the wheels.

A further object of my invention is to provide a ball bearing axle which will allow the car wheels to turn independently of each other.

A still further object of my invention is to eliminate all unnecessary parts or elements and improve upon my former construction generally.

With the foregoing and other objects in view that will appear as the nature of the invention is better understood, the same consists in the novel features of construction, combination and arrangement of parts illustrated in the drawings and more particularly pointed out in the appended claims.

In the accompanying drawings, which are for illustrative purposes only and are therefore not drawn to scale:—

Fig. 3 is a vertical longitudinal section of one end of the axle and associated parts, on an enlarged scale, the wheel shown in dotted lines.

Figs. 4, 5 and 6 are detail perspective views of a ball retainer, dust guard and keeper ring and Fig. 7 is a vertical transverse section, taken on line 7—7 of Fig. 1.

Figure 1:
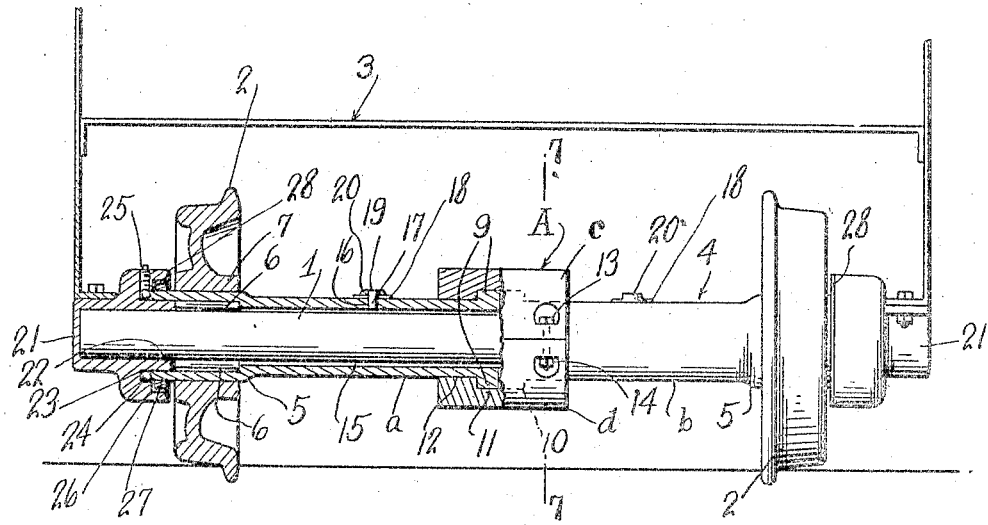
Figure 1 is a side elevation, partly in section, illustrating my invention.
Figure 2:
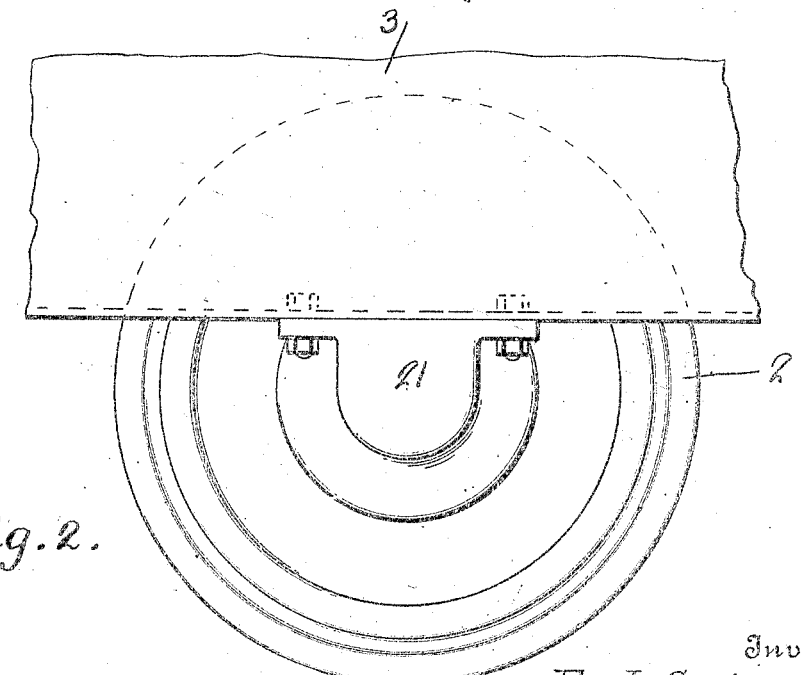
Fig. 2 is an end view.

Referring to the drawings for a more particular description of the invention and in which drawings like parts are designated by like reference characters throughout the several views, 1 represents the bearing axle, 2 the wheels and 3 the truck frame. The bearing axle comprises the solid cylindrical stationary shaft or axle 1 of cold rolled steel or iron, on which is revolubly mounted a hollow cylindrical sleeve 4, provided at each end with a cylindrical enlargement 5. Within the enlargement at each end of the sleeve 4 is arranged a continuous circular series of bearing rollers 6, which extend longitudinally of the sleeve and shaft and work or travel around the former. The cylindrical enlargements 5 of the sleeve are of somewhat greater length than that of the bearing rollers, as shown, and project somewhat beyond the outer ends of the hubs 7 of the wheels 8, which are pressed or keyed to the enlargements in the usual way.

The hollow cylindrical sleeve 4 comprises two corresponding sections *a* and *b* formed at their inner ends with the bearing flanges 9 and 10 which work against each other, as shown. The inner ends of the two sections of the sleeve 4 are detachably connected together by the coupling A, consisting of the upper and lower coupling members *c* and *d* of semi-circular form in cross section, said coupling members comprising the relatively narrow intermediate portions 11 which fit over the outer edges of the annular bearing flanges 9 and 10 and are formed at opposite sides with the inwardly extending flanges 12 which engage or interlock with the outer faces of said bearing flanges. The two members of the coupling are secured together by the bolts and nuts 13 and 14, respectively. Through the use of the above construction, the car wheels are allowed to turn independently of each other.

The annular space 15 between the shaft or axle 1 and the sleeve 4 is filled with grease which may be replenished at any time necessary through a transverse opening 16 in the sleeve, normally closed by a plug 17 held in place by a cotter pin 18 inserted through the outer end 19 of the plug and an annular boss 20 cast on the outer surface of the sleeve around said opening 16.

A hollow cylindrical cap 21 preferably of cast steel, fits on each end of the shaft or axle 1 with its inner end projecting slightly into the outer end of the adjacent enlargement 5 of the sleeve. The inner end of each cap is provided with an annular flange 22 which surrounds the same and projects somewhat over or overlaps the outer end of the adjacent enlargement of the sleeve, said annular flange forming a circular ball race 23 in which is arranged a continuous circular series of bearing balls 24. It will be noted that in my present construction, I eliminate the oil cup over each series of bearing balls 24, as shown in my Patent No. 1,210,422 and simply replace same with a threaded plug 25, the purpose of which will be apparent.

The outer end of each cap 21 may or may not be closed, as desired and may be of any shape or form required to fit any truck now in use or to be used in order that my improved ball bearing axle may be interchanged with the old style axle. It will also be noted that the shaft or axle 1 is preferably not fastened anywhere and the caps 21 held in place by the frame of the car, although in some instances, if found expedient, the caps may be fastened to the axle by a single bolt.

In carrying out my invention, a thin metal ring 26 is placed in each cap 21 over the bearing balls 24 and serves to hold the latter in place. A felt washer 27 is placed over each ring 26 and around the outer ends of the cylindrical enlargements of the sleeve 4 and acts as a guard to exclude the dust and at the same time retain the lubricating oil. Over each washer 27 is placed a metal ring 28 which is fastened to the corresponding cap 21 by the fastening screws 29 and serves to hold the ball retainer and dust guard in place.

The two series of ball bearings above mentioned are to take care of the side motions occasioned by the car in swaying back and forth and especially in rounding curves, while the weight of the car is borne by the bottom of the axle around which the bearing rollers 6 work, thus reducing friction between the stationary and movable parts to the minimum. Attention is also invited to the fact that by rigidly mounting the car wheels on the outer revoluble member or sleeve, all liability of the car trucks leaving the track because of lateral displacement of the wheels, is obviated.

From the foregoing description taken in connection with the drawings, it is thought that the construction and operation as well as advantages of this invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A ball and roller bearing axle of the character specified, comprising an inner stationary shaft, a hollow sleeve revolubly mounted thereon and provided at opposite ends with cylindrical enlargements, a circular series of bearing rollers arranged in the enlargement at each end of the sleeve, around said shaft, hollow caps freely mounted on opposite ends of said shaft and held in position by the truck frame, said caps provided at their inner ends with annular ball races and bearing balls arranged in said ball races against the ends of the sleeve.

2. A ball and roller bearing axle of the character specified, comprising an inner stationary shaft, a hollow sleeve revolubly mounted thereon, hollow caps mounted on opposite ends of said shaft, said caps provided in their inner ends with inner and outer stepped recesses, the former constituting ball races, bearing balls arranged in said ball race forming recesses against the ends of the sleeve, a ball retainer and dust guard arranged in the outer recess of each cap, the dust guards surrounding and fitting over the ends of the sleeve and keeper rings fastened to the inner ends of the caps and serving to retain the ball retainers and dust guards in place.

In testimony whereof I affix my signature.

FRED. J. COCHRAN.